(12) United States Patent
Everwyn et al.

(10) Patent No.: US 10,345,190 B2
(45) Date of Patent: Jul. 9, 2019

(54) METHOD FOR DETECTING A FLUID LEAK IN A TURBOMACHINE AND FLUID DISTRIBUTION SYSTEM

(71) Applicant: SAFRAN AIRCRAFT ENGINES, Paris (FR)

(72) Inventors: Alexandre Patrick Jacques Roger Everwyn, Verrieres le Buisson (FR); Arnaud Rodhain, Maisons Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 61 days.

(21) Appl. No.: 15/537,745

(22) PCT Filed: Dec. 22, 2015

(86) PCT No.: PCT/FR2015/053704
§ 371 (c)(1),
(2) Date: Jun. 19, 2017

(87) PCT Pub. No.: WO2016/102878
PCT Pub. Date: Jun. 30, 2016

(65) Prior Publication Data
US 2018/0058973 A1    Mar. 1, 2018

(30) Foreign Application Priority Data

Dec. 24, 2014 (FR) ..................................... 14 63331

(51) Int. Cl.
*B64F 5/60* (2017.01)
*F02C 6/08* (2006.01)
(Continued)

(52) U.S. Cl.
CPC ............... *G01M 3/28* (2013.01); *B64D 15/04* (2013.01); *B64F 5/60* (2017.01); *F01D 17/08* (2013.01);
(Continued)

(58) Field of Classification Search
CPC . B64F 5/60; B64D 15/04; F01D 17/08; F02C 6/08; F02C 7/047; F02C 7/277;
(Continued)

(56) References Cited

U.S. PATENT DOCUMENTS

| 4,757,963 A | 7/1988 | Cole |
| 5,400,984 A | 3/1995 | Arnold et al. |
| 7,930,928 B2 | 4/2011 | Ruston |

FOREIGN PATENT DOCUMENTS

| EP | 0 205 283 A1 | 12/1986 |
| GB | 2 259 679 A | 3/1993 |

OTHER PUBLICATIONS

International Search Report dated Apr. 15, 2016 in PCT/FR2015/053704 filed Dec. 22, 2015.
(Continued)

*Primary Examiner* — Maceeh Anwari
(74) *Attorney, Agent, or Firm* — Oblon, McClelland, Maier & Neustadt, L.L.P.

(57) ABSTRACT

A method for detecting a high temperature fluid leak in a turbomachine. The turbomachine includes a source of high temperature pressurized fluid, at least one fluid distribution line suitable for distributing said high temperature fluid, and a turbomachine compartment wherein the distribution line is at least partially housed. The method includes measuring at least two pressure parameters of the turbomachine compartment, including a measured pressure and a pressure variation over time; detecting a high temperature fluid leak when at least one of the two pressure parameters of the turbomachine compartment reaches a characteristic value of a high-temperature fluid leak in the compartment. A high-temperature fluid distribution system and a turbomachine comprising such a high temperature fluid distribution system.

15 Claims, 2 Drawing Sheets

(51) Int. Cl.
- *F02C 9/24* (2006.01)
- *F02K 3/04* (2006.01)
- *G01M 3/28* (2006.01)
- *G01M 3/32* (2006.01)
- *B64D 13/06* (2006.01)
- *B64D 13/08* (2006.01)
- *B64D 15/04* (2006.01)
- *B64D 33/02* (2006.01)
- *F01D 17/08* (2006.01)
- *F02C 7/047* (2006.01)
- *F02C 7/277* (2006.01)
- *G01M 15/14* (2006.01)

(52) U.S. Cl.
CPC ............... *F02C 6/08* (2013.01); *F02C 7/047* (2013.01); *F02C 7/277* (2013.01); *F02C 9/24* (2013.01); *F02K 3/04* (2013.01); *G01M 3/2815* (2013.01); *G01M 3/2846* (2013.01); *G01M 3/3272* (2013.01); *G01M 15/14* (2013.01); *B64D 13/08* (2013.01); *B64D 33/02* (2013.01); *B64D 2013/0607* (2013.01); *B64D 2033/0233* (2013.01); *F05D 2220/36* (2013.01); *F05D 2260/80* (2013.01); *F05D 2270/09* (2013.01); *F05D 2270/309* (2013.01); *F05D 2270/3015* (2013.01); *Y02T 50/672* (2013.01)

(58) Field of Classification Search
CPC .......... F02C 9/24; F02K 3/04; G01M 3/2815; G01M 3/2846; G01M 3/3272; G01M 15/14
USPC ...................................................... 701/34.4
See application file for complete search history.

(56) References Cited

OTHER PUBLICATIONS

French Search Report dated Oct. 22, 2015 in FR 1463331 filed Dec. 24, 2014.
U.S. Appl. No. 14/714,551, filed May 18, 2015, US 2015/0337679 A1, Alexandre Patrick Jacques Roger, Everwyn et al.

METHOD FOR DETECTING A FLUID LEAK IN A TURBOMACHINE AND FLUID DISTRIBUTION SYSTEM

TECHNICAL FIELD

The invention relates to the field of turbomachines for aircrafts and in particular to the field of fluid distribution systems equipping such turbomachines. By turbomachine, it is meant in the present specification any propelling assembly with a turbine. The propelling assembly is not limited to the engine itself, and can comprise in particular a nacelle.

STATE OF PRIOR ART

Fluid, in particular pressurised fluid, distribution systems in turbomachines generally involve a high number of lines some of which can be disposed at least partly in sensitive zones of the turbomachines.

Therefore, because of the generally high temperature of these pressurised fluids, any leak in a line in one of these sensitive zones of the turbomachine can become an issue and damage the turbomachine. That is in particular the case for the nacelle Anti Icing (NAI) circuit, and the pressurised air fluid circuit of the starter, which are partly housed in a fan zone located radially outwardly of the fan casing of the turbomachine and inwardly of the nacelle. More precisely, the fan zone is located radially inwardly of a nacelle cowling.

Indeed, the fan of a turbomachine, and more particularly the fan zone, can include elements of composite material(s) with a low temperature resistance. Yet, a leak in the fan zone of the pressurised air passing through the NAI circuit can cause a strong temperature increase in this zone which is likely to exceed 350° C. At these temperatures, said elements of composite material(s) can only keep their integrity on a relatively short time slot, typically in the order of 15 s.

For these reasons, it is thus necessary to develop fluid leak detecting methods.

From document U.S. Pat. No. 7,930,928, it is known to install temperature sensors in sensitive zones. These temperature sensors enable a method for monitoring the fluid in these sensitive zones to be developed by detecting any abnormal temperature rise. Such a temperature monitoring thus allows the detection of an unusual high temperature fluid supply in the sensitive zone which can only come from a high temperature fluid leak.

Accordingly, such a leak detecting method enables high temperature fluid leaks to be detected regardless of the origin of these leaks and the number of lines likely to leak. However, as shown in FIG. 1, the temperature sensors used have some inertia. Indeed, FIG. 1 is a graph representing the real temperature 901 in the zone during a fluid leak simulation paralleled with the temperature 902 measured by the temperature sensor. As a result, whereas the fluid leak results in a nearly instantaneous temperature rise in the zone (the total duration of the temperature rise is lower than 5 s), the temperature sensor shows a much slower temperature rise (this is in the order of 130-140 s) since this sensor acts on the room temperature as a low pass filter having a high time constant. For example, for a threshold temperature of 120° C., considered as critical for elements of composite material(s) having a low temperature resistance, approximately 15 s are necessary to detect it whereas it is reached in the zone within one second. If a latency delay typically of 8 s is added to this delay to process the information and for the processing unit of the turbomachine to close the valves of the line of the fluid distribution system, the elements of composite material(s) are consequently subjected to this critical temperature for a time close to 23 s. It can also be added that the delays given here relate to a temperature sensor facing the leak, and that a sensor placed remotely from the leak location can add a further delay of a few seconds.

Since this time ideally must not exceed 15 s to save the integrity of the elements of composite material(s), it is necessary to reduce the detection time, for example to within 7 s if the latency delay is 8 s and regardless of the leak location with respect to the sensor.

This issue is particularly present for the fluid distribution system which includes the pressurised high temperature air feed line both of the aircraft and the starter of the turbomachine and the air feed line of the NAI circuit. Indeed, these lines have conduits which are typically housed in the fan zone of the turbomachine, in particular for feeding the starter and the anti-icing circuit of the intake duct with pressurised air. Yet, as already indicated, the fan zone is particularly sensitive because of the elements of composite material(s) it contains. It is thus particularly important that such a high temperature pressurised air distribution system enables an air leak to be detected at a high temperature in the fan zone regardless of the magnitude of the fluid leak.

DISCLOSURE OF THE INVENTION

One object of the invention is to overcome this drawback and one purpose is thus to provide a high temperature fluid leak detecting method in a turbomachine which enables a high temperature fluid leak to be detected in a zone of the turbomachine with a detection delay reduced in comparison with prior art and which has low dependency to the positioning of the measuring system in the turbomachine zone, this detecting method having to enable both a low flow rate fluid leak, such as that corresponding to a line cracking, and a high flow rate fluid leak, such as that corresponding to a line de-inserting to be detected.

To that end, the invention relates to a leak detecting method of a high temperature fluid in an aircraft turbomachine, said turbomachine including:
  a pressurised high temperature fluid source,
  at least one fluid distribution line suitable for distributing said high temperature fluid to different parts of the turbomachine and/or the aircraft which are intended to be equipped with said turbomachine,
  a turbomachine zone in which the distribution line is at least partly housed, said zone having in use a pressure lower than that of the high temperature fluid,
  the method including the following steps of:
  measuring at least one pressure parameter of the turbomachine zone,
  detecting a high temperature fluid leak when the pressure parameter of the turbomachine zone reaches a threshold value characteristic of a high temperature fluid leak in the zone.

More precisely, the invention relates to a method including the following steps of:
  measuring at least two pressure parameters of the turbomachine zone including a measured pressure and a pressure variation over time,
  detecting a high temperature fluid leak when at least one of both pressure parameters of the turbomachine zone reaches a threshold value characteristic of a high temperature fluid leak in the zone.

The pressure of the turbomachine zone is defined as the gas, generally air, pressure prevailing inside the zone. By pressure parameter of the zone, it is meant a measured quantity representative of the instantaneous pressure, that is the quantity measured at a given instant represents fairly faithfully the pressure at the same instant. Conversely, as explained in the foregoing, the temperature measured inside the zone is not representative of the instantaneous pressure because in particular of the inertia of the temperature sensors, and thus does not make up a pressure parameter of the zone.

With such a method, it is possible to detect a high temperature fluid leak in the zone within a delay much lower than that of a simple detection by temperature threshold. Indeed, the fluid supply in the zone during a leak generally generates a pressure increase in the zone which is distributed throughout the volume of the zone whereas the temperature rise remains localised, in a first time, at the leak. Furthermore, the pressure sensors do not have the inertia problems of temperature sensors and thus make it possible to detect as soon as the leak appears the pressure rise resulting therefrom.

Therefore, with this detecting method, it is possible to detect the appearance of a high temperature fluid leak in the zone with a detection delay much lower than that of a method of prior art regardless of the location of the leak in the zone.

It will be further noted that such a method is suitable for detecting fluid leaks regardless of the flow rate of these leaks. Indeed, the measurement of two parameters, including a measured pressure and a pressure variation over time, enables detection of strong flow rate fluid leaks which will be quickly detected by the measurement of the variation over time, whereas the measured pressure enables low flow rate fluid leaks to be detected, given that the latter could not be detected by measuring the variation over time. In this manner, a quick detection of fluid leaks is provided regardless of their flow rate.

By low temperature relative to high temperature, it is meant above and in the rest of this document that the temperature difference between the high temperature fluid provided by the fluid source and the temperature prevailing in the zone is higher than 50° C. and preferentially than 100° C.

By pressurised fluid it is meant above and in the rest of this document, a fluid the pressure of which is higher than or equal to 0.2 MPa or even 4 MPa. The pressure in the zone will be generally low relative to that of the pressurised fluid, that is it will be at least 2 times, or even 4 times, lower than that of a high temperature pressurised fluid.

By "reach", it is to be intended of course that the pressure parameter becomes equal to or higher than the threshold value.

The measured pressure can be a measured pressure selected from the group including an absolute pressure of the turbomachine zone, a relative pressure of the turbomachine zone with respect to the atmospheric pressure and a differential pressure representative of the difference between the air pressure in the zone and the gas pressure in a reference area. Detecting a leak can occur when the pressure measured in the turbomachine zone reaches a pressure threshold value characteristic of a high temperature fluid leak in the zone.

Such a pressure parameter enables an efficient leak detection to be achieved since it makes it possible to detect a low intensity pressurised fluid leak which generates a gradual pressure, and thus temperature, increase.

Detecting a leak can occur when the pressure variation over time in the turbomachine zone reaches a variation threshold value characteristic of a high temperature fluid leak in the zone.

Such a parameter is particularly suitable for enabling a strong intensity leak to be quickly detected. Indeed, such a leak generates a quick pressure increase in the zone and thus a strong variation. Therefore, detecting can occur even if the pressure has not yet reached a value characteristics of a high temperature fluid leak.

The pressure variation over time can be a gradient, dP/dt, or even a pressure difference, ΔP, between two given instants.

During the measuring step, two parameters can be measured: the measured pressure and the pressure variation over time in the turbomachine zone. Detecting a leak can occur when at least one from the measured pressure and the pressure variation over time in the zone reaches a respective threshold value.

Such a method enables a quick high temperature fluid leak to be detected for significant leaks, such as those related to a line de-inserting, while enabling less significant high temperature fluid leaks to be detected, such as those related to a line cracking.

When the turbomachine is in use, said zone can be sealingly insulated from the fluid distributed by the at least one fluid distribution line.

Such a method is particularly advantageous for such a zone. Since the zone is sealingly insulated with respect to the high temperature fluid, it is not necessarily configured to withstand high temperatures, which is in particular the case when the zone comprises at least one element of composite material(s). Thereby, it is all the more important to prevent any fluid leak.

Since the method is intended to be implemented on an aircraft including at least one second turbomachine, said at least one pressure parameter of the zone can come from a pressure comparison with respect to the second turbomachine, the leak detection occurring when it results from the comparison that the pressure in the zone becomes higher by a threshold value than that of a zone of the second turbomachine, said threshold value being characteristic of a high temperature fluid leak in the zone of the first turbomachine.

Such a method by varying the redundancy of the turbomachines equipping an aircraft, enables relatively low pressure difference thresholds to be used and thus the turbomachine leaving its normal state to be quickly detected, which is represented by the other turbomachine. Thus, an efficient detection is achieved both for significant leaks as well as for more reduced ones.

The method can comprise a further step of:
closing said at least one fluid distribution line if a leak is detected.

Such a step enables the high temperature pressurised fluid leak to be stopped in the zone when such a leak has been detected. That enables brittle elements of the zone, such as the elements of composite material(s), to be preserved with respect to high temperature.

The turbomachine zone is radially located between a fan casing and a nacelle cowling of the turbomachine.

The high temperature fluid can be air from a compressor of the turbomachine, the turbomachine including a first and a second fluid distribution line, the first line being a line for distributing air to the aircraft and a starter of the turbomachine, the second line being a line for distributing air at an air intake duct of the turbomachine in order to feed an anti-icing system, the first and the second line being at least partly housed in the zone.

The method of the invention is particularly suitable for detecting a leak in such a zone and to enable leaks of such fluid distribution lines to be detected. Indeed, the zone radially located between a fan casing and a nacelle cowling of the turbomachine includes elements of composite material which is particularly sensitive to leaks which could occur on the line for distributing air to the aircraft and to a starter of the turbomachine and on the line for distributing air at an air intake duct of the turbomachine in order to feed an anti-icing system.

The invention also relates to a fluid distribution system for an aircraft turbomachine, the system including:
- a pressurised high temperature fluid source,
- at least one high temperature fluid distribution line suitable for distributing said fluid to different parts of the turbomachine and/or the aircraft which are intended to be equipped with said turbomachine,
- a turbomachine zone wherein the distribution line is at least partly housed, said zone having in use of the turbomachine a pressure lower than that of the high temperature fluid,
- at least one measuring means suitable for enabling a pressure parameter of the turbomachine zone to be measured,
- a processing unit arranged to control the means for measuring a pressure parameter of the turbomachine zone, the processing unit is configured to detect a high temperature fluid leak when the pressure parameter of the zone obtained from the measuring means reaches a threshold value characteristic of a high temperature fluid leak in the zone.

More precisely, the at least one measuring means is suitable for enabling at least two pressure parameters of the turbomachine zone including a measured pressure and a pressure variation over time to be measured, the processing unit is arranged to receive data from measurements made by the measuring means, and the processing unit is configured to detect a high temperature fluid leak when at least one of both parameters of the zone pressure obtained from the measuring means reaches a threshold value characteristic of a high temperature fluid leak in the zone.

Such a system enables a leak detecting method according to the invention to be implemented and thus benefits from the advantages related to the method according to the invention.

The zone can be sealingly insulated with respect to the fluid distributed by the at least one line which is at least partly housed therein, and can have an internal volume which is higher than twice the total volume of the part of the at least one line which is housed in the zone.

By internal volume of a zone, it should be meant, here and in the rest of this document, the volume delimited by the inner walls of the zone, that including the volume occupied by the elements contained in said internal volume, such as the volume occupied by the part of the at least one line which is housed in the zone.

Said zone can be closed and contain an air volume which is higher than twice the total volume of the part of the at least one line which is housed in the zone.

By air volume contained in the zone, it should be meant herein and in the rest of this document, the internal volume of the zone containing air, that is which is not occupied by an element contained in the internal volume such as the part of the at least one line which is housed in the zone.

Said zone can comprise at least one element of composite material(s) having an insufficient temperature resistance to withstand the fluid high temperature beyond a predetermined delay lower than 30 seconds.

Said element of composite material(s) can consist of a zone wall adjacent to an air volume through which the at least one high temperature fluid distribution line passes.

Such a distribution system is particularly suitable for protecting the element of composite material(s) in case of high temperature fluid leak, since detecting the leak could be made in a time much lower than 30 seconds.

The invention also relates to a turbomachine including a fluid distribution system according to the invention.

Such a turbomachine, by enabling a method according to the invention to be implemented, benefits from the advantages related thereto.

BRIEF DESCRIPTION OF THE DRAWINGS

The present invention will be better understood upon reading the description of exemplary embodiments, given by way of purely indicating and in no way limiting purposes, making reference to the appended drawings in which.

The different parts represented in the figures are not necessarily drawn to a uniform scale, to make the figures more legible.

The different possibilities (alternatives and embodiments) should be understood as being not exclusive of one another and can be combined with each other.

DETAILED DISCLOSURE OF PARTICULAR EMBODIMENTS

Figure 2:
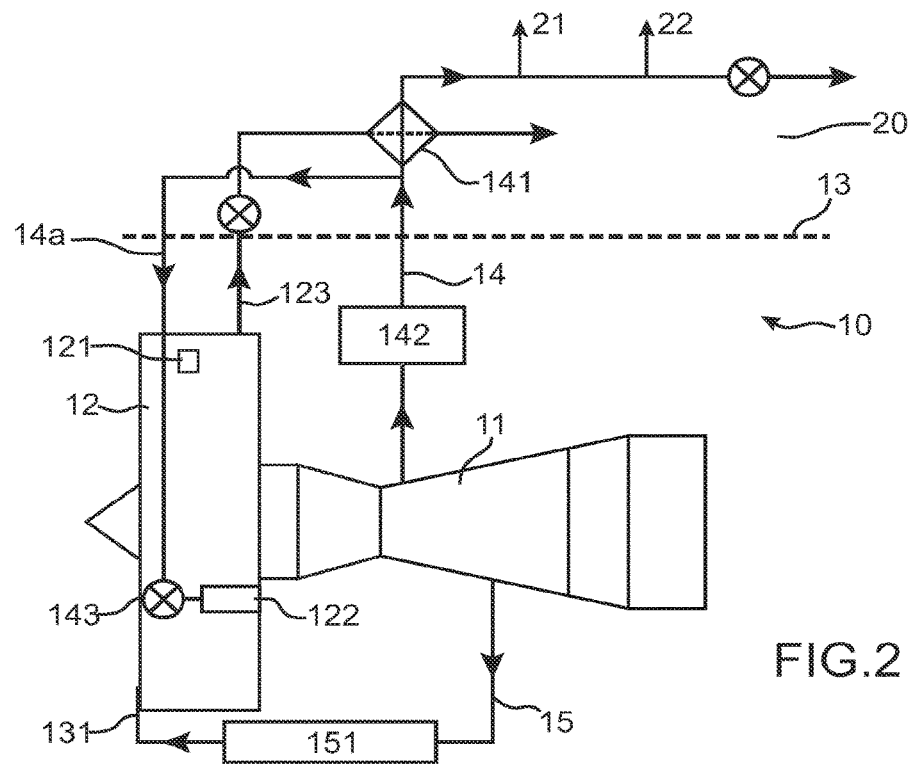

FIG. 2 schematically illustrates an exemplary pressurised high temperature fluid distribution system, more precisely with pressurised air, according to the invention equipping a turbomachine 10. Said turbomachine equips an aircraft.

Such a fluid distribution system includes:
- a high pressure compressor 11 forming a high temperature pressurised air source,
- a fan having a casing 12 which delimits internally a secondary flow path and outside of which a pressure sensor 121 for measuring the pressure in a fan zone,
- a nacelle 13 of the turbomachine including an intake duct 131 of the turbomachine for air intake in the same,
- a first high pressure line 14 for sampling high temperature pressurised air from the high pressure compressor to the aircraft, said first line including a secondary branch 14a for feeding pressurised air to a starter 122 of the turbomachine,
- a second line 15 for anti-icing of the nacelle 13 and the intake duct 131 of the turbomachine 10, an engine calculator known as FADEC for "Full Authority Digital Engine Control", not represented.

The fan zone is radially located between the fan casing 12 and a cowling of a nacelle 13 of the turbomachine. It generally includes elements of high temperature sensitive composite material(s). The fan zone 12 is thus a sensitive zone of the turbomachine in which it is important to detect a possible high temperature fluid leak, such as pressurised air provided by the high pressure compressor 11. Indeed, these elements of composite material(s) have generally an insufficient temperature resistance to withstand the fluid high temperature beyond a predetermined delay lower than 30 seconds, or even lower than or equal to 15 seconds.

Conventionally, the air pressure in the fan zone is between 0.02 and 0.14 MPa. The fan zone is sealingly insulated with respect to the fluid distributed by the first and the second line. Its internal volume the gas volume it contains are both higher than the total volumes of the parts of the first and second lines 14, 15 which are housed in the fan 12.

The high pressure compressor 11 enables the first and the second line 14, 15 to be fed with high temperature pressurised air that can typically reach 500° C.

The first line 14 is arranged to sample pressurised air from the high pressure compressor 11 in order to feed the aircraft with pressurised air in particular to the air conditioning system 21 of the aircraft and the wing anti-icing system 22 of the aircraft.

Upstream of a heat exchanger 141 enabling the pressurised air to be cooled from the air sampled in the fan (from the line referenced 123 in FIG. 2), the first line 14 includes a secondary line 14*a* towards the starter 122. Thus, the first line 14 enables the starter 122 located in a centre area of the engine to be fed with pressurised air the temperature of which is typically in the order of 360° C. The pressure in the secondary line 14*a* of the first line 14 is generally between 0.3 and 10 MPa.

The first line 14 includes first valves 142, typically called ECS (Environmental Control System) valves to control air flow rates sampled from the high pressure compressor 11.

The second line 15 enables the anti-icing circuit of the air intake duct 131 of the nacelle 13 to be fed. The second line 15 includes second valves 151 to control the flow rate on the air sampled from the high pressure compressor 11. Typically the second line 15 enables the anti-icing circuit of the air intake duct 131 to be fed with pressurised air with a temperature in the order of 500° C. The pressure of the air flowing in this second line 15 is generally between 2 and 3 MPa.

Irrespective of whether it is the first or second line 14, 15, a part of their respective conduits is housed in the fan zone. Thus, in case of a leak of one of these conduits in the fan zone, that generates a high temperature pressurised air supply and thus a temperature rise in the zone. Such a temperature rise is detrimental for some elements of composite material(s) that can be in the fan zone.

In order to enable such leaks to be detected, the fan zone comprises a pressure sensor 121 which, to detect any pressure rise that a warm air leak would cause in the fan zone. In a usual configuration, this pressure sensor 121 can be a pressure sensor present in the zone of turbomachines of prior art, such as the pressure sensor known as Pressure SubSystem.

Figure 1:
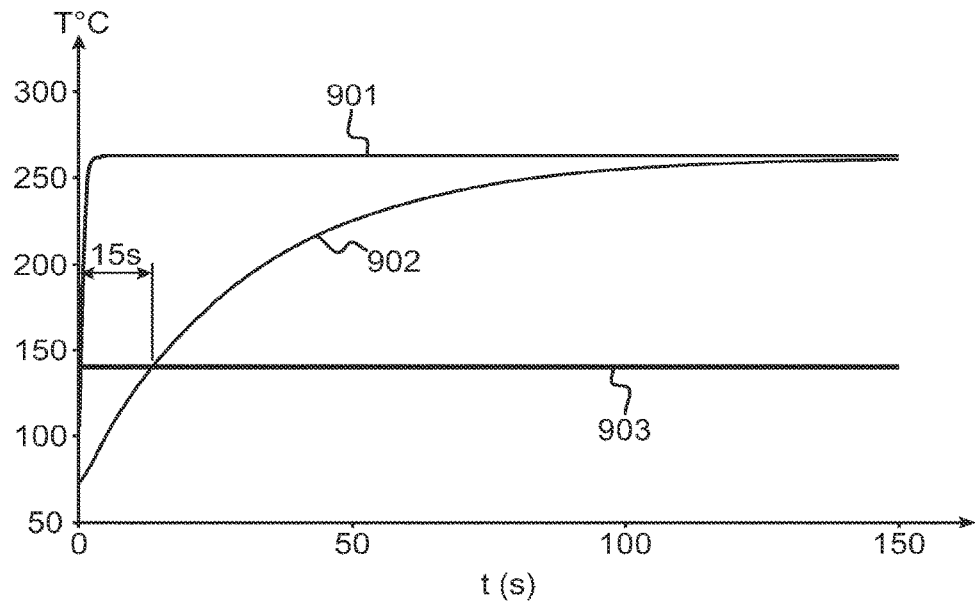
FIG. 1 is a graph representing the temperature variation in a fan zone of a turbomachine during a high temperature pressurised air leak paralleled with the temperature measured by a temperature sensor of the same fan zone, FIG. 2 schematically illustrates a fluid distribution circuit of a turbomachine.
Figure 3:
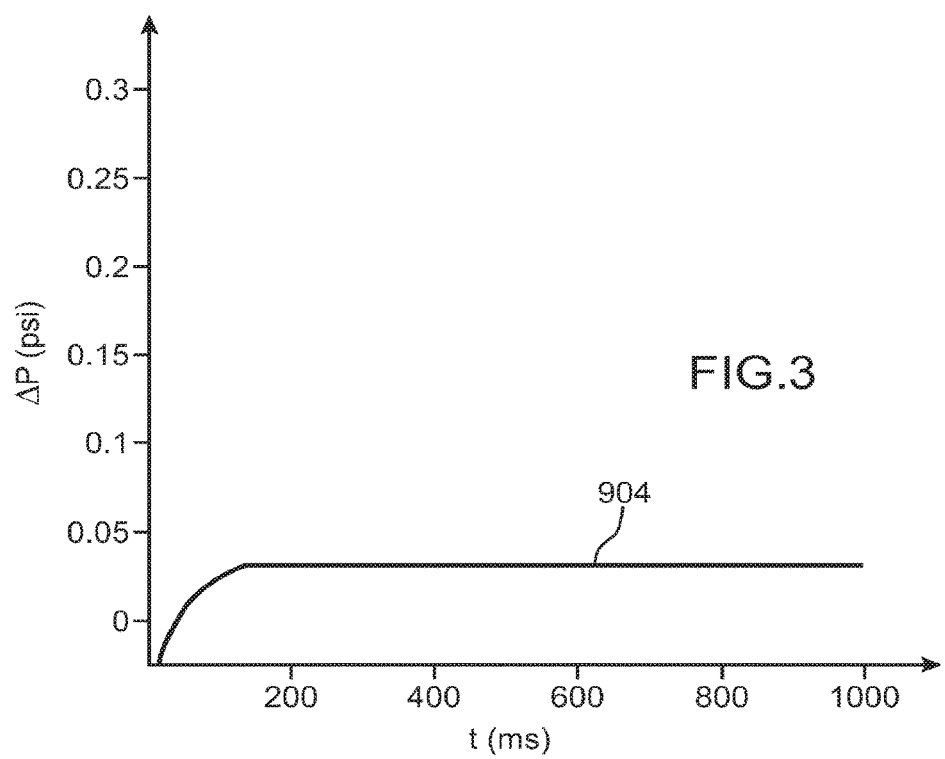
FIG. 3 is a graph representing the pressure rise in the fan zone of a turbomachine during a leak of the NAI line with a low intensity.
Figure 4:
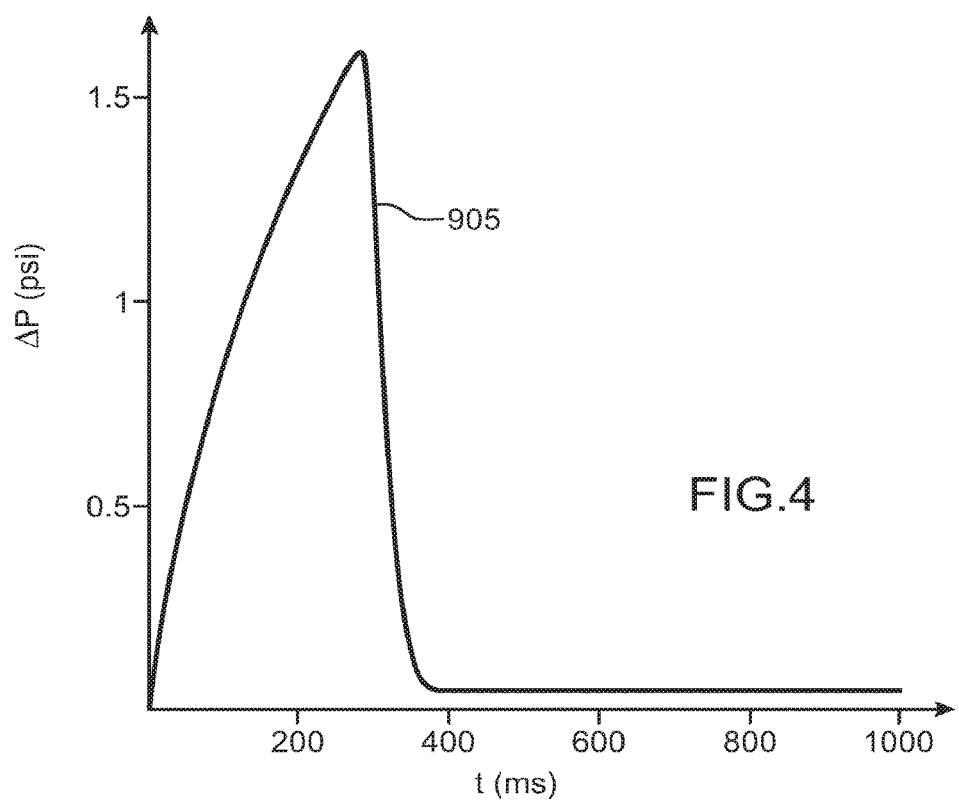
FIG. 4 is a graph representing the pressure rise in the fan zone of a turbomachine during a leak in the pressurised air feed line of the starter with a low intensity with opening the pressure limiting door at 300 ms.

FIGS. 3 and 4 thus illustrate the pressure rise in the fan zone measured by such a pressure sensor 121 during a conduit rupture of respectively the first line and the second line 14, 15. It is here important to pay attention to the scale difference of the abscissas between FIG. 1 and FIGS. 3 and 4. The scale of FIG. 1 is in seconds, the measured temperature 901 taking about 150 s to reach the maximum value, whereas the scale of FIGS. 3 and 4 is in milliseconds, the measured pressure variation 904, 905 taking in both cases less than 400 ms to reach its maximum value. That demonstrates that monitoring the pressure in the fan zone enables a leak detection with a temperature monitoring to be achieved much more quickly. A leak detection based on such a pressure measurement thus allows a sufficiently quick detection to enable operations necessary to close the leaking line to be performed such that the elements of composite material(s) are not subjected to a critical temperature for a time higher than 23 s.

FIG. 3 more precisely illustrates the pressure rise in the fan zone during a conduit rupture in the first line 14, the pressure variation being a differential pressure expressed in psi, that is "pound-force per square inch", 1 psi being equal to about 6 900 Pa. Thus, during the rupture of the first conduit 14, that feeding the starter, the pressure increases by about 0.05 psi, that is 345 Pa, over a time much lower than 200 ms.

FIG. 4 shows that the pressure increase is much higher during the rupture of a conduit of the second line 15, that feeding the anti-icing circuit of the air intake duct 131 with pressurised gas. Indeed, during such a conduit rupture, the differential pressure in the fan zone can exceed 1.5 psi, that is exceed 10 000 Pa. To be more precise, the pressure of the fan zone during such a rupture reaches, as shown by the abrupt pressure decrease a bit before 400 ms, the threshold value of the pressure limiting panel from which said panel opens. Thus it is observed that, when this threshold value is reached, the opening of the pressure limiting panel causes a reduction in the pressure which becomes in the order of 0.1 psi, that is 690 Pa.

The pressure sensor 121 is in communication with the engine calculator.

To enable a high temperature pressurised air leak to be detected in the fan zone, the engine calculator is configured to implement a method comprising the following steps of:
  measuring the pressure in the fan zone from the pressure sensor 121 in order to determine at least one pressure parameter such as the value of the measured pressure, the pressure variation over time, a pressure difference towards a pressure of another element of the turbomachine or in the fan zone of another turbomachine,
  detecting a high temperature pressurised air leak if at least one pressure parameter reaches, that is higher than or equal to, a threshold value characteristic of a high temperature pressurised air leak in the zone.

Thus, according to a first possibility of the invention, the parameter can be the measured pressure value and a high temperature fluid leak is thus detected if the measured pressure value exceeds a predefined threshold value. This predefined threshold value is a value chosen as being characteristic of a high temperature pressurised fluid leak in the fan zone.

According to this possibility, two configurations of the engine calculator are contemplatable, either the threshold value is a fixed value chosen so as to enable a leak to be detected regardless of the turbomachine state, or the threshold value is a variable assuming determined values as a function of measured parameters representative of the turbomachine state. The first configuration is to be preferred within the scope of a simple implementation of the leak detection. In this first configuration, the threshold value can, for example, be set to 0.2 MPa.

The second configuration is to be preferred for a quicker detection. Indeed with such a second configuration, the threshold value can be suitable as a function of the turbomachine state and not set with regard to the turbomachine state in which the pressure in the fan zone is the highest. Regardless of the configuration retained, such a first possibility is particularly suitable for detecting low intensity pressurised fluid leaks, such as the one that can be created in case of a line cracking.

According to a second possibility of the invention, the parameter can be the pressure variation over time between two given instants, such as a gradient, dP/dt, or a pressure difference, ΔP. According to this possibility, the threshold value is thus a threshold pressure variation of the same type. This second possibility uses the strong pressure rise generated by the pressurised fluid supply by the leak in the fan zone. As for the first possibility of the invention, the engine calculator can have two configurations in which the threshold value is respectively a fixed or variable threshold value. The respective advantages of both these configurations are identical to those set out for the first possibility. This second possibility is particularly suitable for quickly detecting a strong intensity fluid leak, such as the one that can be created during a line de-inserting. According to this second possibility, considering that the pressure variation over time is a determined pressure gradient between two instants, a pressure gradient threshold value set between 200 and 3 000 Pa·s$^{-1}$, and preferentially equal to 500 Pa·s$^{-1}$, is suitable.

According to the third possibility, the parameter can be a pressure difference between the pressure in the fan zone and the same pressure in the fan zone of another turbomachine, such as a second turbomachine equipping the aircraft. Such a difference comes from the comparison between the pressure in the fan zone and that in the fan zone of the other turbomachine. Thus, insofar as the turbomachine and the other turbomachine have parallel operating phases and thus have similar operating parameters, a higher pressure in the fan zone in one turbomachine with respect to that of the other turbomachine enables a pressurised fluid supply and thus the presence of a pressurised fluid leak to be identified. The characteristic threshold value corresponds to a pressure difference characteristic of a leak according to this possibility.

Within the scope of this third possibility, in order to make sure of a reliable leak detection, the engine calculator can be configured to make detection active only in the operating phases of the turbomachine in which it operates in parallel with the other turbomachine with substantially identical operating parameters. Thus, for example, the engine calculator can be configured not to implement fluid detection during the starting phase of the turbomachine in which the pressure in the fan zone is particularly high, which can generate an unbalance between both turbomachines.

The engine calculator can be configured to implement a single one of the three possibilities above, several of these possibilities simultaneously, or even implement several of these possibilities successively and depending on the operating state of the turbomachine.

Likewise, depending on the possibility selected from the three possibilities above, the engine calculator can be configured to inhibit leak detection during some operating phases of the turbomachine in which the pressure parameter of the fan zone is known to exceed the threshold value characteristic of a leak. Such a configuration enables a low threshold value to be set to allow a quick detection in the case where the leak risk is higher while avoiding "false positive" detections which could create the above mentioned operating phases.

Likewise, the detection principle according to the invention is not incompatible with the leak detection methods according to prior art, in particular that described in document U.S. Pat. No. 7,930,928. Thus, the engine calculator can perfectly be configured to implement, in parallel and/or alternately, a leak detection according to any of the possibilities mentioned based on a pressure measurement and a detection according to prior art based on a temperature measurement.

The engine calculator is also configured to, when a pressurised air leak is detected, close the lines likely to originate it. In addition to this closing of the first and second valves, the engine calculator can also be configured to thereby transmit an error code to the aircraft so as to indicate that a breakdown has just happened.

The aircraft can thus, upon receiving the error code, close the ECS valve and transmit the error message to the pilot for the same to be able to:
- exit from flight conditions in which there is an ice appearance risk, since the nacelle anti-icing capabilities are lost,
- and avoid to use the starter feed valve.

That enables the detrimental consequences that a high temperature fluid leak could have in the fan zone to be avoided.

With such a configuration, the engine calculator forms a processing unit configured to provide from the pressure sensors 121 a measurement of the pressure parameter of the fan zone, and to detect a fluid leak if the pressure parameter of the zone is higher than or equal to a threshold value. According to a preferred alternative of the invention, the engine calculator can be configured to detect a fluid leak if the pressure parameter is strictly higher than the threshold value characteristic of a leak.

It is to be noted that if in the above-described embodiment, the leak detecting method allows a pressurised air leak detection in the fan zone of the turbomachine, it can be suitable for detecting a leak in another sensitive zone of the turbomachine.

The invention claimed is:

1. A leak detecting method of a high temperature fluid in an aircraft turbomachine, said turbomachine including a pressurised high temperature fluid source producing the high temperature fluid, at least one fluid distribution line distributing said high temperature fluid to different parts of the turbomachine and/or an aircraft including said turbomachine, and a turbomachine zone, wherein the fluid distribution line is at least partly housed in the turbomachine zone, said turbomachine zone having in use of the turbomachine a pressure lower than a temperature of the high temperature fluid, the method comprising:
   measuring at least a first and a second pressure parameters of the turbomachine zone, the first pressure parameter corresponding to measured pressure and the second pressure parameter corresponding to a pressure variation over time; and
   detecting a high temperature fluid leak when at least one of the first and the second pressure parameter of the turbomachine zone is equal or greater than a first and a second threshold value of a high temperature fluid leak in the turbomachine zone respectively.

2. The leak detecting method according to claim 1, wherein the first parameter is a measure pressure selected from a group including an absolute pressure of the turbomachine zone, a relative pressure of the turbomachine zone with respect to the atmospheric pressure, and a differential pressure representative of the difference between the pressure in the turbomachine zone and the pressure of a reference area, and wherein detecting the high temperature fluid leak when the first pressure parameter is equal or greater than the first pressure threshold value of a high temperature fluid leak in the turbomachine zone.

3. The leak detecting method according to claim 1, wherein detecting the high temperature fluid when the second pressure parameter is equal or greater than the second variation threshold value of a high temperature fluid leak in the turbomachine zone.

4. The leak detecting method according to claim 1, wherein said turbomachine zone is sealingly insulated with respect to the high temperature fluid distributed by the at least one fluid distribution line.

5. The leak detecting method according to claim 1 for an aircraft including at least one second turbomachine having a second turbomachine zone, wherein said first pressure parameter is based on a pressure comparison between the pressure of the turbomachine zone and the second turbomachine zone, detecting the leak when the turbomachine zone pressure is higher by the first threshold value than the pressure of the second turbomachine zone of the second turbomachine, said first threshold value being a high temperature fluid leak in the turbomachine zone of the first turbomachine.

6. The leak detecting method according to claim 1, further comprising:
closing said at least one fluid distribution line when a leak is detected.

7. The leak detecting method according to claim 1, wherein the turbomachine zone is radially located between a fan casing and a cowling of a nacelle of the turbomachine.

8. The leak detecting method according to claim 1, wherein the high temperature fluid is air from a compressor of the turbomachine, said at least one fluid distribution line including a first and a second fluid distribution line, the first fluid distribution line distributing air to the aircraft and a starter of the turbomachine, the second fluid distribution line distributing air at an air intake duct of the turbomachine to feed an anti-icing system, the first and the second fluid distribution line being at least partly housed in the turbomachine zone.

9. The leak detecting method according to claim 1, wherein said one fluid distribution line includes at least a first and a second fluid distribution lines for distributing the high temperature fluid, both the first and the second fluid distribution lines being at least partly housed in the turbomachine zone, the method further comprising:
closing the first and the second fluid distribution lines when a fluid leak is detected.

10. A high temperature fluid distribution system for an aircraft turbomachine, the system comprising:
a pressurised high temperature fluid source providing the high temperature fluid;
at least one distribution line for high temperature fluid, the at least one distribution line distributing said high temperature fluid to different parts of the turbomachine and/or an aircraft including said turbomachine;
a turbomachine zone, wherein the at least one fluid distribution line is at least partly housed in the turbomachine zone, said turbomachine zone having in use of the turbomachine a pressure lower than the pressure of the high temperature fluid;
at least one pressure sensor configured to measure two pressure parameters of the turbomachine zone including a measured pressure and a pressure variation over time; and
an engine calculator configured to receive the measured two pressure parameters, engine calculator being configured to detect a high temperature fluid leak when at least one of the measured two pressure parameters of the turbomachine zone is equal or greater than a threshold value of a high temperature fluid leak in the turbomachine zone.

11. The high temperature fluid distribution system according to claim 10, wherein said turbomachine zone is sealingly insulated with respect to the fluid distributed by the at least one distribution line, and has an internal volume higher than twice a total volume of a part of the at least one line being housed in the turbomachine zone.

12. The fluid distribution system according to claim 10, wherein said turbomachine zone is closed and contains an air volume higher than twice a total volume of a part of the at least one line being housed in the turbomachine zone.

13. The high temperature fluid distribution system according to claim 10, wherein said turbomachine zone comprises at least one element of composite material(s) with a temperature resistance insufficient to withstand the fluid high temperature beyond a predetermined delay lower than 30 seconds.

14. The high temperature fluid distribution system according to claim 13, wherein said element of composite material(s) consists of a turbomachine zone wall adjacent to an air volume through which at least one fluid distribution line passes.

15. A turbomachine comprising:
a high temperature fluid distribution system, wherein the system includes
a pressurised high temperature fluid source providing the high temperature fluid;
at least one distribution line distributing said high temperature fluid to different parts of the turbomachine and/or an aircraft including said turbomachine;
a turbomachine zone, wherein the at least one fluid distribution line is at least partly housed in the turbomachine zone, said turbomachine zone having in use of the turbomachine a pressure lower than the pressure of the high temperature fluid;
at least one pressure sensor configured to measure two pressure parameters of the turbomachine zone including a measured pressure and a pressure variation over time; and
an engine calculator configured to receive the measured two pressure parameters, the engine calculator being configured to detect a high temperature fluid leak when at least one of the measured two pressure parameters of the turbomachine zone is equal or greater than a threshold value of a high temperature fluid leak in the turbomachine zone.

* * * * *